United States Patent Office 3,472,845
Patented Oct. 14, 1969

3,472,845
TERPENYL AMINOALKYL ETHERS AND THIOETHERS
Kurt Thiele, Frankfurt am Main, Germany, assignor to Deutsche Gold- und Silber-Scheideanstalt vormals Roessler, Frankfurt am Main, Germany
No Drawing. Filed July 12, 1966, Ser. No. 564,525
Claims priority, application Germany, July 13, 1965, D 47,715
Int. Cl. C07d *87/34;* A61k *27/00*
U.S. Cl. 260—247.7      9 Claims

ABSTRACT OF THE DISCLOSURE

Method of treating inflammations occurring in bodies of mammals wherein a terpenyl ether of the formula T—Y—Alk—N=X wherein T is a terpenyl radical selected from the group consisting of linalyl, nearyl, citronellyl, nerolidyl, farnesyl, phytyl and terpinyl (4), Y is selected from the group consisting of oxygen and sulfur, Alk is alkylene of 2–8 carbon atoms and —N=X is selected from the group consisting of

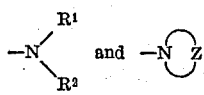

wherein $R^1$ and $R^2$ individually is selected from the group consisting of hydrogen, alkyl, alkenyl, cycloalkyl, aralkyl and aryl and alkyl, alkenyl, cycloalkyl, aralkyl and aryl substituted with a substituent selected from the group consisting of halogen, alkyl, hydroxy, alkoxy and dialkyl amino alkyl, and Z is selected from the group consisting of alkylene, oxa alkylene and aza alkylene is administered to mammals affected with inflammations and certain novel antiinflammatory ethers of said formula.

The present invention concerns the discovery that terpene ethers of the following formula unexpectedly possess good antiinflammatory action when administered enterally or parenterally:

T—Y—Alk—N=X wherein T is a terpene radical derived from a cyclic or acyclic terpene of the formula $C_nH_{2n-x}$ by removal of one hydrogen atom or of the formula $C_nH_{2n-y}OH$ by removal of the OH group and $n=5$–20, $x=0$–6 and $y=0$–6; Y is oxygen or sulfur; Alk is a straight or branch chained alkylene group with 2 to 8 C atoms and —N=X is

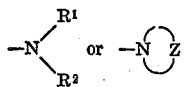

wherein $R_1$ and $R_2$ each is hydrogen, alkyl, e.g. lower alkyl, alkenyl, cycloalkyl, aralkyl, aryl and substituted alkyl, alkenyl, aralkyl and aryl, Z is alkyene of 4–6 carbon atoms as in pyrrolidine or piperidine or oxa-alkylene as in morpholine or aza-alkylene as in piperazine or substituted alkylene, oxa-alkylene and aza-alkylene.

Certain of such terpene ethers are novel compounds. Typical terpene radicals T, for instance, are bisabolyl, linalyl, neryl, citronellyl, geranyl, nerolidyl, phytyl, farnesyl, menthyl, α-terpinyl, β-terpinyl, terpinyl (4), bornyl, isobornyl, fenchyl or nopyl.

The terpene ethers concerned according to the invention exhibit a very good antiphlogistic action on albumen edema of the rat paw when administered orally, intramuscularly or intravenously in a dosage range of 1–500 mg./kg. The acute toxicity LD 50 mg./kg. in mice upon oral administration is over 500 mg./kg.

Such terpene ethers as already mentioned are antiinflammatory medicaments, with the following indications:

Chronic polyarthritis
Rheumatic ailments
Posttraumatic inflammations
Postoperative inflammations
Swellings with fractures
Thrombophlebitis in all forms (including post-operative)
Bursitis
Synovitis
Collagenoses (polymyositis, periarthritis)
Gout
Intraperitoneal adhesions The medicaments according to the invention, if desired, also in combination with other pharmaceutically active substances, can be administered as pharmaceutical compositions which are suitable for enteral or parenteral administration. The administration can be in the form of tablets, capsules, pills, dragees, suppositories, oily or aqueous solutions or suspensions, emulsions, injectible aqueous or oily solutions or suspensions. The individual doses, depending on form of administration, are between 0.1 and 100 mg. one to three times a day.

The compounds according to the invention can be prepared by:

(1) Alkylating a terpene alcohol or thioalcohol of the formula

T—YH with a compound of the formula

Hal—Alk—N=X wherein Hal represents a halogen atom, in the presence of an alkali metal or silver with or without solvents at a temperature between about 0° and 200° C.

(2) Reacting a terpene halide of the formula

T—Hal with a compound of the formula

HY—Alk—N=X (3) Reacting a terpene alkyl ether or thioether of the formula

T—Y—Alk—Hal with an amine of the formula

HN=X in the presence of basic substances such as soda, potash, tertiary amines or amines in excess with or without solvent at temperatures between about 0° and 200° C.

In procedure 1 the terpene alcohol or thioalcohol can either first be converted to the corresponding alcoholate with the aid of alkali metal amides, alkali metal, alkali metal hydrides, alkali metal hydroxides or silver oxide or the terpene alcohol or thioalcohol and the alkyl halide are reacted simultaneously in the presence of an alkali metal hydroxide.

Aromatic hydrocarbons, dioxane, tetrahydrofurane-N-methyl pyrrolidone or dimethyl sulfoxide, for example, can be used as solvents in procedures 1, 2 and 3.

The terpene ethers according to the invention can be converted into their pharmaceutically acceptable non-toxic salts or quaternary ammonium compounds. When racemic they can be resolved into their optically active components by known methods.

The following examples will serve to illustrate the terpene ether compounds which according to the invention have been found to have antiinflammatory properties.

EXAMPLE 1

(2-diethylamino-ethyl)-disabolyl ether

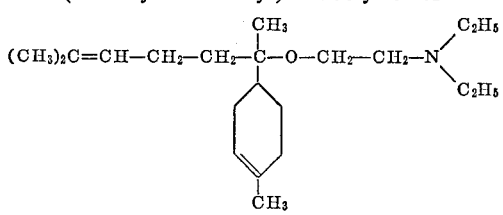

22.2 g. of (—)=α=bisabolol were converted into the corresponding alcoholate by heating in 60 ml. of toluene at boiling temperature with 8 g. of sodium amide suspension and then 13.5 g. of diethyl aminoethyl chloride added thereto. The solvent was then distilled off and the temperature raised to 160° C. After maintaining this temperature for 2 hours the reaction mixture was cooled down and taken up in ether. The ether solution was washed twice with water and then extracted with dilute HCl to a pH of 4. The aqueous solution was rendered alkaline and shaken out with ether. After drying with potassium carbonate the ether was distilled off and the residue distilled under vacuum. The yield of the (2-diethylamino-ethyl)-bisabolyl ether was 18 g. Its boiling point was 139° C. at 0.005 torr.

EXAMPLE 2

(2-morpholino-ethyl)-disabolyl ether was prepared in a manner analogous to that of Example 1 from (—)=α=bisabolol and morpholino ethyl chloride. Its boiling point at a pressure of 0.005 torr was 142° C. The base formed a hydrochloride with hydrochloric acid which after recrystallization from acetone-petroleum ether had a melting point of 144° C. The yield was 42%.

EXAMPLE 3

(3-diethylamino-propyl)-bisabolyl ether was prepared in a manner analogous to that of Example 1 from (—)=α=bisabolol and 3-diethylamino propyl chloride. Its boiling point at a pressure of 0.005 torr was 141° C. The yield was 49%.

EXAMPLE 4

(2-morpholino-ethyl)-linalyl ether

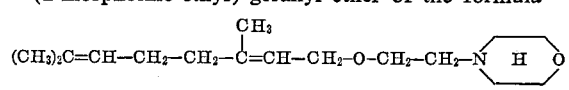

was prepared in a manner analogous to that of Example 1 from linalool and morpholino ethyl chloride. Its boiling point at a pressure of 0.1 torr was 110° C. The yield was 46%.

EXAMPLE 5

(2-morpholino-ethyl)-neryl ether

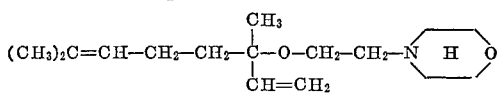

was prepared in a manner analogous to that of Example 1 from nerol and morpholino ethyl chloride. Its boiling point at a pressure of 0.1 torr was 120° C. The hydrochloride thereof after recrystallization from methyl ethyl ketone melted at 103° C. The yield was 52%.

EXAMPLE 6

(2-diethylamino-ethyl)-meryl thioether 5 g. of sodium amide suspension were added to 8.7 g. of 2-diethylamino ethyl thiol in 30 ml. of toluene. Thereafter 14 g. of neryl bromide were added dropwise and the mixture heated under reflux for 3 hours. The solution was washed twice with water and extracted with dilute hydrochloric acid. The aqueous solution was rendered alkaline and shaken out with ether. The ether solution was boiled down and the residue fractionated under vacuum. The boiling point of the product was 118° C. at 0.2 torr. The yield was 7 g. or 40% of theory.

EXAMPLE 7

(2-morpholino-ethyl)-citronellyl ether of the formula

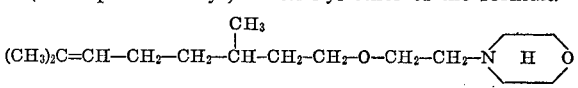

was prepared in a manner analogous to that of Example 1 from citronellol and morpholino ethyl chloride. The base had a boiling point of 120° C. at 0.01 torr. The hydrochloride after recrystallization from acetone-ether had a melting point of 74° C. The yield was 40%.

EXAMPLE 8

(2-morpholino-ethyl)-geranyl ether of the formula

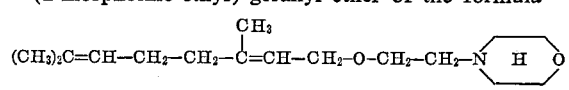

was prepared in a manner analogous to that of Example 1 from geraniol and morpholino ethyl chloride. The base had a boiling point of 105° C. at 0.1 torr. The hydrochloride thereof had a melting point of 90° C. The yield was 55% of theory.

EXAMPLE 9

(2-morpholino-ethyl)-nerolidyl ether of the formula

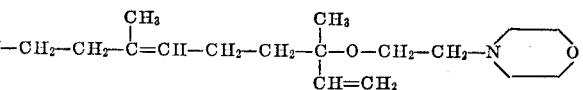

22 g. of nerolidol were transformed to the alcoholate by boiling in 60 ml. of toluene with 17.8 g. of a 50% sodium amide suspension and reacted with 15 g. of 1 morpholino-2-chloroethane while the solvent was distilled off. The reaction mixture was then stirred for 2 hours at 160° C. and was then taken up with benzene and water. The benzene solution was then boiled down and the residue distilled under vacuum. 11 g. of the base were obtained which had a boiling point of 138° C. at 0.01 torr. The yield was 27% of theory.

EXAMPLE 10

(2-morpholino-ethyl)-farnesyl ether of the formula

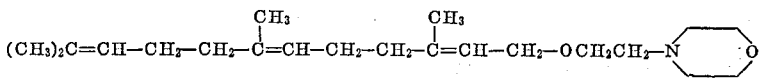

was produced by a process analogous to that of Example 1 from farnesol and morpholino ethyl chloride. The base had a boiling point of 150° C. at 0.01 torr. The yield was 30% of theory.

EXAMPLE 11

(2-morpholino-ethyl)-menthyl ether of the formula was produced by a process analogous to that of Example 1 from menthol and morpholino ethyl chloride. The base had a boiling point of 105° C. at 0.01 torr. The yield was 47% of theory.

EXAMPLE 12

(2-morpholino-ethyl)-terpinenyl-(4)-ether of the formula was produced by a process analogous to that of Formula 1 from terpinenol-(4) and morpholino ethyl chloride. The base had a boiling point of 106° C. at 0.1 torr. The yield was 67% of theory.

EXAMPLE 13

(2-morpholino-ethyl)-phytyl ether of the formula was prepared by a process analogous to that of Example 1 from phytol and morpholino ethyl chloride. The base had a boiling point of 183° C. at 0.01 torr.

EXAMPLE 14

(2-diethylamino-ethyl)-linalyl-thioether of the formula was prepared by a process analogous to that of Example 6 from linalyl bromide and 2-diethylamino-ethyl thiol. The base had a boiling point of 126–128° C. at 0.5 torr. The crystalline citrate which was formed therewith in alcoholic solution had a melting point of 96–98° C.

I claim:

1. A terpenyl ether of the formula T—Y—Alk—N=X wherein T is a terpenyl radical selected from the group consisting of linalyl, neryl, citronellyl, nerolidyl, phytyl and bisabolyl, Y is selected from the group consisting of oxygen and sulfur, Alk is alkylene of 2–3 carbon atoms and —N=X is selected from the group consisting of and morpholino and where $R_1$ and $R_2$ are selected from the group consisting of hydrogen and lower alkyl.

2. A compound according to claim 1 wherein T is bisabolyl.

3. A compound according to claim 2 wherein —N=X is

4. A compound according to claim 3 wherein $R_1$ and $R_2$ are lower alkyl.

5. A compound according to claim 2 wherein —N=X is morpholino.

6. A compound according to claim 5 which is (2-morpholino-ethyl)-bisabolyl ether.

7. A compound according to claim 1 wherein —N=X is

8. A compound according to 7 wherein $R_1$ and $R_2$ are lower alkyl.

9. A compound according to claim 1 wherein —N=X is morpholino.

No references cited.

ALEX MAZEL, Primary Examiner
JOSE TOVAR, Assistant Examiner

U.S. Cl. X.R.

260—247.1, 584, 563, 326.5, 294.7, 293.4, 268, 570.8, 573, 570.9, 583; 424—248, 267, 274, 325